United States Patent Office 3,540,283
Patented Nov. 17, 1970

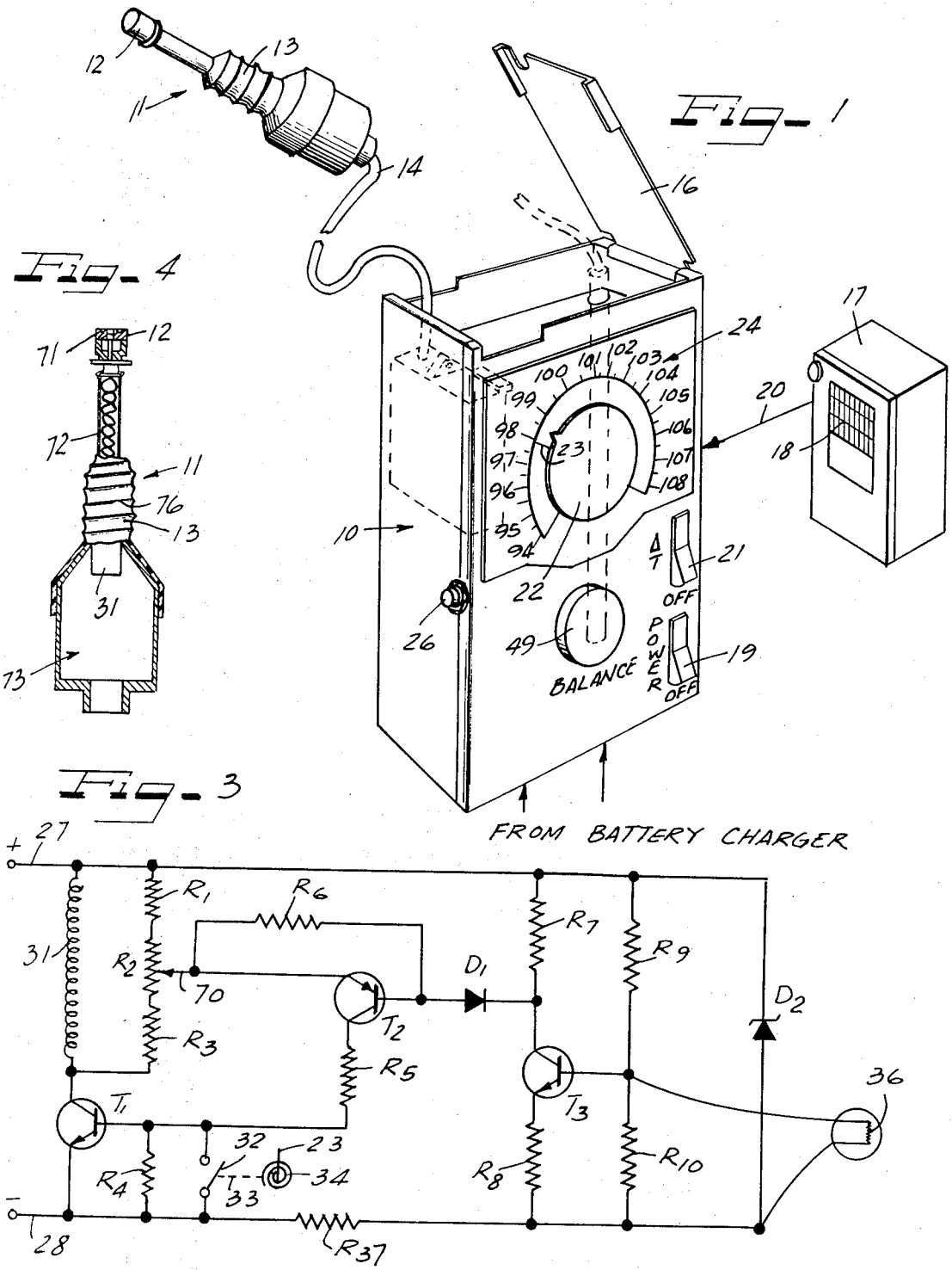

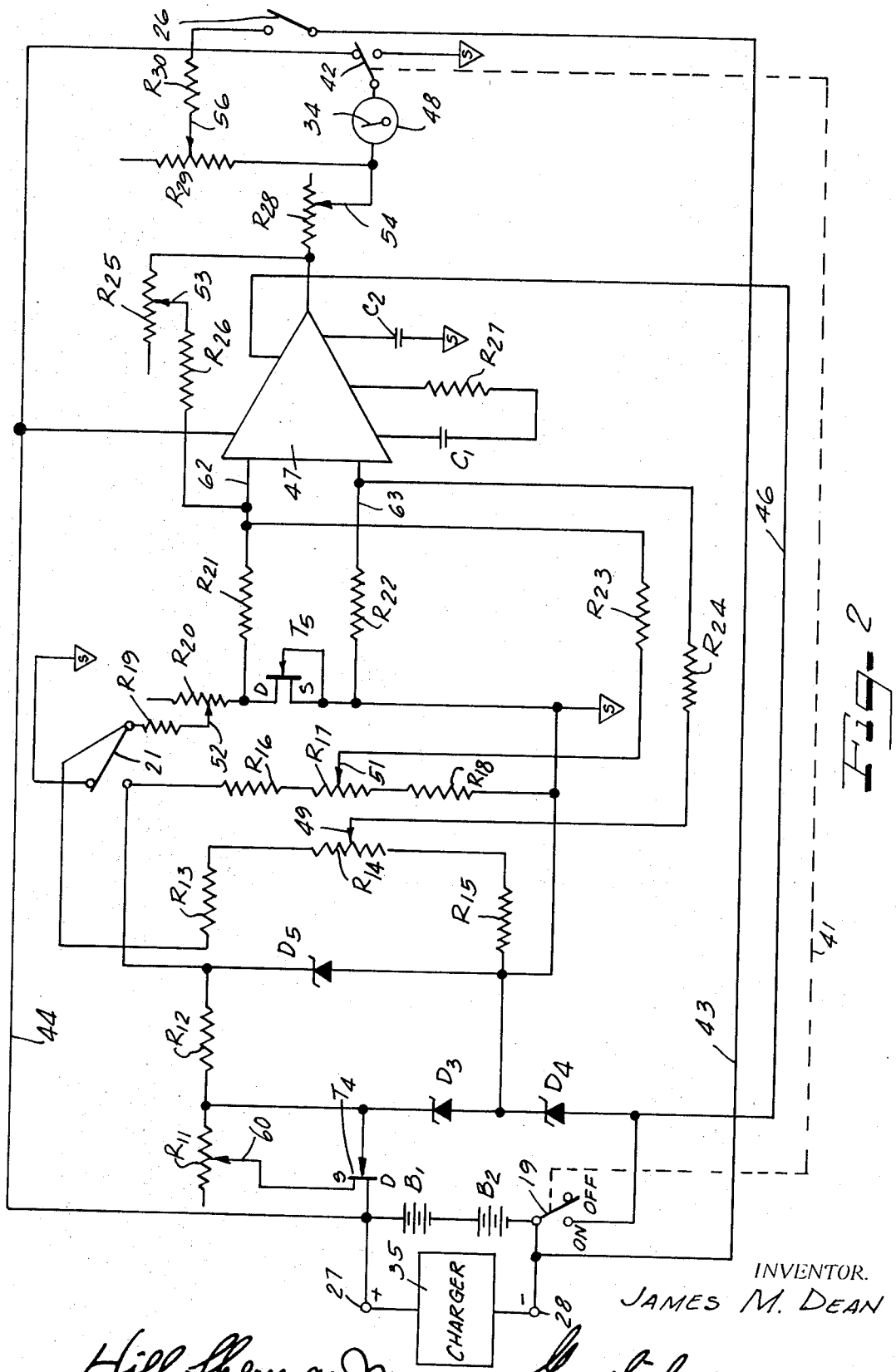

3,540,283
TEMPERATURE SENSOR
James M. Dean, Des Plaines, Ill., assignor to Charles P. De Vito, Harwood Heights, and Albert P. De Vito, Niles, Ill., and Ralph R. Erlich, Los Angeles, and Michael M. Fine, Beverly Hills, Calif., as trustees
Filed Dec. 23, 1968, Ser. No. 786,331
Int. Cl. G01k 7/00; H01l 15/00
U.S. Cl. 73—362          10 Claims

ABSTRACT OF THE DISCLOSURE

A temperature sensor which may be powered by batteries but is not subject to inaccuracy in reading caused by the batteries becoming partially discharged. An input field effect transistor regulates the battery supply so as to control the accuracy of the sensor. The sensor is also automatically maintained at a temperature which is near the temperature to be sensed so that a rapid response may be obtained.

CROSS-REFERENCES TO RELATED APPLICATIONS

This invention is an improvement of the device described in copending application entitled "Temperature Sensing Device," Ser. No. 672,204, filed October 2, 1967, now Pat. No. 3,491,596, of Jan. 27, 1970.

BACKGROUND OF THE INVENTION

Field of the invention

This invention relates in general to temperature sensors and in particular to a temperature sensor of high accuracy with very fast response. The temperature sensor may be powered by batteries and a field effect transistor is utilized to monitor and control the voltage applied to the sensing circuits so as to maintain great accuracy of the sensor. It is very desirable to rapidly determine the temperature. For example, in hospitals, the temperature of the patient must be taken two or three times a day and it normally takes a nurse five minutes or more to determine the temperature of a patient with a thermometer.

Every object in nature emits radiant energy as a function of its absolute temperature and simultaneously each object absorbs some portion of the energy emitted in its direction by every other object in its direct line of sight. At all time, therefore, every object both admits and absorbs radiant energy. Whether it gains or loses heat by this process depends upon whether it absorbs more energy than it admits or vice versa. This radiant energy is used in the detecting probe of the present temperature sensor.

Description of the prior art

Prior temperature sensing devices have employed thermister elements which produce a variation in resistance in response to variations in temperature. Such thermister elements are normally incorporated into the leg of a bridge circuit with a meter or other read-out device connected across the bridge. Such temperature sensing devices have a resonse time of from thirty seconds to one minute which, although it is faster than conventional mercury-type thermometers, is still not as fast as the present invention.

SUMMARY OF THE INVENTION

The present invention provides a temperature sensing device which gives a temperature of the body in a relatively short period of time and which has a high degree of accuracy.

A sensing element comprising a transistor of the field effect type comprises a probe in which the temperature sensing element is mounted and a heater is also mounted in the probe so as to preheat the probe to the expected vicinity of the temperature to be recorded. For example, if the body temperature of human beings is being recorded the probe may be preheated by the heater to a temperature of 94° and the sensing transistor will quickly detect the temperautre of a patient when the probe is placed in the ear or other detecting point. By preheating the probe, the sensor does not have to be heated by the body whose temperature is being detected from room temperature to the temperature of the body.

The temperature sensor of this invention comprises a compact battery-operated unit which has a high degree of accuracy due to a current stabilizing means which is connected across the battery so as to apply a standard power supply ot the unit. Since the voltage of batteries varies from full charge to discharge, the present invention assures accurate and rapid response with an entire useful range of the discharge period of the batteries.

Other and further objects, features and advantages of the present invention will become apparent to those skilled in the art from the following detailed disclosure thereof and the drawings attached hereto and made a part hereof.

BRIEF DESCRIPTION OF THE DRAWINGS

FIG. 1 is a perspective view of the temperature sensor of this invention;

FIG. 2 is a schematic view of the temperature sensor of this invention;

FIG. 3 is a schematic view of the heater control circuit of this invention; and

FIG. 4 is a view of the probe of this invention.

DESCRIPTION OF THE PREFERRED EMBODIMENTS

FIG. 1 illustrates a temperature sensor of this invention which has a case designated generally as 10 and a probe 11 in which is mounted a temperature responsive field effect element 12. The probe illustrated in FIG. 1 may be inserted in the ear or other body openings, as described in copending application Ser. No. 672,204, and a sealing shield 13 is mounted on the probe. A cable 14 is connected from the probe 11 to the main body of the sensor 10 and carries various electrical conductors. The main body of the temperature sensor 10 has a storage compartment formed in its upper end into which the probe 11 may be stored when not in use and a pivotal lid 16 is connected to the top of the sensor 10 to close the storage compartment. A strip line recorder 17 with recording pin and paper 18 may be connected to the temperature sensor 10 by a cable 20 to record a temperature sensed by the probe as a function of time.

An on-off power switch 19 is mounted on the face of the temperature sensor 10 and a temperature reading switch 21 is also mounted on the face of the instrument. A battery testing switch 26 is mounted on the side of the sensor 10. A balance knob 49 is mounted on the face of the instrument. Indicia 24 is printed on the temperature sensor above the balance knob 49 and a meter movement 23 may be read against the indicia 24. A reference setting pointer 22 may be moved so that it may be set to a reference point on the indicia 24 if desired.

The temperature sensor 10 is formed with charging terminals and the whole unit may be placed into a charger to charge the batteries contained within the temperature sensor.

FIG. 2 is an electrical schematic of the temperature sensor of this invention. A charger 35 is connected to terminals 27 and 28 of the temperature sensor when the unit is in the charger. Terminal 28 is connected to the negative terminal of a battery $B_2$ which is connected in series with a battery $B_1$ which has its other terminal connected to the terminal 27. Terminal 27 is also connected to the drain of a field effect transistor $T_4$. The source of the field effect transistor $T_4$ is connected to wiper contact 60 which engages resistor $R_{11}$. Then the resistor $R_{11}$ is connected to resistor $R_{12}$ which is connected to signal ground through resistors $R_{16}$, $R_{17}$ and $R_{18}$. A pair of Zener diodes $D_3$ and $D_4$ are connected between the gate of the transistor $T_4$ and a lead 46. The gate $T_4$ is also connected to the junction point between resistors $R_{11}$ and $R_{12}$. The power on switch 19 has its movable contact connected to terminal 28 and is movable to engage a contact which is connected to lead 46 when power is turned on. A Zener diode $D_5$ is connected between one end of resistor $R_{12}$ and the junction point between the diodes $D_3$ and $D_4$. This point is also connected to signal ground. Resistors $R_{13}$, $R_{14}$ and $R_{15}$ are connected between signal ground and the movable contact of the temperature read switch 21. The temperature read switch, when in the on position, engages a contact which is connected to the diode $D_5$ and when in the off position engages a contact which is connected to signal ground. The movable contact of switch 21 is also connected to a resistor $R_{19}$ that is connected to a wiper contact 52 that engages resistor $R_{20}$. $R_{20}$ has one end connected to the drain of the temperature sensing field effect transistor $T_5$. The gate and source of the transistor $T_5$ are connected together and to signal ground. An operational amplifier 47 has input terminals 62 and 63. The input terminal 62 is connected through resistor $R_{21}$ to the drain of transistor $T_5$. This terminal is also connected through resistor $R_{23}$ to a wiper contact 51 which engages resistor $R_{17}$. Terminal 63 is connected to signal ground through resistor $R_{22}$ and through resistor $R_{24}$ to balance wiper contact 49 which engages the resistor $R_{14}$. A lead 46 is connected from the diode $D_4$ to the operational amplifier 47 and capacitor $C_1$ and resistor $R_{27}$ are connected in circuit with the operational amplifier 47 and a capacitor $C_2$ is connected between the operational amplifier and signal ground. The feedback signal is supplied from the output of the operational amplifier through a resistor $R_{25}$, a wiper contact 53 and a resistor $R_{26}$ to the input terminal 62 of the operational amplifier. The output of the operational amplifier is connected to a resistor $R_{28}$. A wiper contact 54 engages the resistor $R_{28}$ and is connected to one side of a meter 48 which has its other side connected to switch 42. Switch 42 is mechanically connected by linkage 41 to the power-on switch 19 and when in the off position engages a stationary contact that is connected to lead 44 that connects to terminal 27 and in the on positoin the switch 42 is connected to signal ground. Battery test switch 26 is connected by lead 43 to terminal 28 and when closed engages a contact that is connected to a resistor $R_{30}$ that is connected to a wiper 56. The wiper contact 56 engages a resistor $R_{29}$ which has its other side connected to the wiper contact 54.

In order to get rapid response of the temperature sensor the probe 11 includes a heater which keeps the temperature sensing element 12 preheated to allow rapid outputs. FIG. 3 illustrates the heater circuit. A room temperature sensing element 36 is mounted in the wall of the case of the temperature sensor 10 and has one terminal connected to resistor $R_{37}$ which has its other side connected to terminal 28. The other terminal of the temperature sensor 36 is connected to the base of a transistor $T_3$ and to the junction point between resistors $R_9$ and $R_{10}$. The emitter of transistor $T_3$ is connected to the resistor $R_8$ which has its other side connected to the resistor $R_{37}$ and to the second side of the resistor $R_{10}$. A diode $D_2$ is connected from resistor $R_{37}$ to the terminal 27. A resistor $R_7$ is connected from terminal 27 to the collector of the transistor $T_3$. A heater element 31 is mounted in the probe unit 11 and has one side connected to the terminal 27 and the other side connected to the collector of the transistor $T_1$. The emitter of transistor $T_1$ is connected to terminal 28. Resistor $R_4$ is connected between the base and emitter of transistor $T_1$. A switch 32 has its movable contact connected to terminal 28 and a stationary contact connected to the base of transistor $T_1$. A linkage 33 controls the movable switch 32. The linkage 33 is connected to the balance spring of the meter movement which controls the indicator 23. When the temperature of the sensor 12 senses a temperature below 94° F., for example, the switch 32 is opened by the meter movement through the linkage 33 to turn the heater 31 on. The base of transistor $T_1$ is connected to a resistor $R_5$ which has its other side connected to the collector of a transistor $T_2$. The base of transistor $T_2$ is connected through a diode $D_1$ to the collector of transistor $T_3$.

Resistors $R_1$, $R_2$ and $R_3$ are connected in parallel with heater 31 and a wiper contact 70 engages resistor $R_2$ and is connected to the emitter of transistor $T_2$. A resistor $R_6$ is connected from the emitter to base of transistor $T_2$.

The heater control circuit of FIG. 3 assures that the probe unit 11 will be maintained at a preset temperature even though the ambient temperature of the room varies. The effect of the thermistor 36 is to sense the temperature of the room in which the unit is being utilized and to vary the amount of current through the heater 31 when the switch 32 is closed by the linkage 33. For example, whenever the switch 32 closes indicating that the temperature of the probe is below, for example, 94° F., current will pass through the heater 31. However, the amonut of current passing through the heater 31 when switch 32 is closed depends on the room temperature sensed by the thermistor 36. For example, at a room temperature of 74° F. and with switch 32 closed, a heater current of 10 mils might pass through the heater 31. If the room temperature drops to 64° F., the current through the heater with switch 32 closed will increase to say 11 mils. The transistors $T_2$ and $T_3$ are effective to sense the change in impedance of the thermistor 36 and when transistor $T_2$ is turned on, it effectively reduces the impedances $R_1$ $R_2$ and $R_3$ to increase the current through the heater element 31. Thus, means are provided so that the heater current is controlled by both the switch 32 and the thermistor 36.

FIG. 4 is a view of the probe and illustrates the relationship of the heater 31 and the sensing element 12.

The heat sensing FET 12 is mounted in a black body radiator 71, which is supported by a sleeve 72. The sleeve 72 is attached to a housing 73 in which the heater 31 is mounted. The housing 73 may be filed with Styrofoam, for example, for good insulating properties.

A sheath 76 of silicone rubber or other suitable material surrounds the probe between the housing 73 and the sleeve 72.

The circuit of this invention allows immediate reading of the temperature on the scale 24 to a very high degree of accuracy. In use, for example, the probe 11 may be placed into the ear of a subject with the soft durable ear cushion 13 conforming to the ear of the subject.

The power switch 19 will be turned on and when the temperature switch 21 is turned on the indicator 23 will indicate the temperature of the subject against the scale 24. Measurements may be made in the inner cavitation of the ear at the tympanic membrane within two seconds. Even faster response may be obtained if the probe is placed under the tongue and readings may be obtained in about one second. The scales 24 may be numbered from 94 to 108. When power switch 19 is turned on and before the probe is placed in the ear of a subject the balance knob 49 is adjusted until the needle 23 aligns with 94° F. on the scale 24. This aligns the amplifier and circuitry. The probe is then placed in the ear or under the recesses of the tongue and the switch 21 is closed and the needle 23 will move to indicate the temperature of the subject.

The temperature sensor may be very compact and in a particular embodiment the thermometer was about 4″ high by 2½″ wide and 1″ thick.

The main advantages of the temperature sensor of this invention is that the power supply applies a very stable voltage to the operational amplifier 47 at all times. For example, the field effect transistor $T_4$ plus the Zener diodes $D_3$ and $D_4$ plus the setting of the balance contact 49 and the other wiper contacts assures that the voltage at the operational amplifier is in the range of 19 to 21.6 volts. Prior temperature circuits utilized two batteries and two separate supplies and if one of the batteries started to drop in voltage due to discharge the temperature reading could be inaccurate by one half of a degree Fahrenheit or more. The present temperature sensor assures that accurate readings will be maintained because the field effect transistor $T_4$ assures constant voltage at the operational amplifier 47. The transistor $T_4$, for example, might be a type 2N5078 which has a VP of 5 volts max. and a IDSS of 12 mils. A change of 2 volts in the batteries $B_1$ and $B_2$ will be compensated for by the field effect transistor $T_4$. This assures constant current at all times through the Zener diodes. If the batteries $B_1$ and $B_2$ are 9 volt nickel cadmium batteries they will have a voltage of 10.8 when fully charged. Thus, the total voltage of the batteries $B_1$ and $B_2$ will vary from 19.6 to 21.6. In this range the field effect transistor $T_4$ will maintain constant input to the operational amplifier 47 and the temperature indication will be very accurate.

To assure that the sensor responds very rapidly the heater 31 reheats the sensing element 12. For example, it might be desirable to preheat the sensor 12 to 94° so that the sensor does not have to be heated from room temperature up to body temperature when used. This is accomplished by the circuit shown in FIG. 3. The thermistor 36 senses room temperature and with the wiper contact 70 set at an appropriate point on resistor $R_2$ the heater 31 will maintain the probe sensing element 12 at 94°. When the temperature of the element 12 goes above 94° as indicated by the pointer 23 the spring 34 will open the switch 32 through the linkage 33. When the temperature of the probe becomes colder than 94°, the switch 32 will be closed by the link 33 by movement of the needle movement 23 and power will be supplied to the heater element to heat the probe unit 12 up to 94°.

Thus, when the power switch is turned on voltage is connected to the negative side of the emitter of transistor $T_1$ turning it on so that current passes through the heater 31. When the switch 32 closes because the temperature goes above 94° at the sensing element 12 the base is connected to the emitter of transistor $T_1$ thus turning it off and the heater is turned off.

In a particular circuit constructed according to this invention the components of the inventions have the following values:

| | | |
|---|---|---|
| $R_1$ | ohms | 8.2K |
| $R_2$ | do | 5K |
| $R_3$ | do | 8.2K |
| $R_4$ | do | 470K |
| $R_5$ | do | 68K |
| $R_6$ | do | 470K |
| $R_7$ | do | 10K |
| $R_8$ | do | 2.2K |
| $R_9$ | do | 500K |
| $R_{10}$ | do | 100K |
| $C_1$ | Pico-farads | 470 |
| $B_1$ | Volts | 9.6 |
| $R_{11}$ | ohms | 500 |
| $R_{12}$ | do | 400 |
| $R_{13}$ | do | 11K |
| $R_{14}$ | do | 300 |
| $R_{15}$ | do | 9K |
| $R_{16}$ | do | 100K |
| $R_{17}$ | do | 300 |
| $R_{18}$ | do | 250 |
| $R_{19}$ | do | 3000K |
| $R_{20}$ | do | 200 |
| $C_2$ | Pico-farads | 33 |
| $B_2$ | Volts | 9.6 |
| $R_{21}$ | ohms | 50K |
| $R_{22}$ | do | 50K |
| $R_{23}$ | | 50K |
| $R_{23}$ | do | 50K |
| $R_{24}$ | do | 100K |
| $R_{25}$ | do | 200K |
| $R_{26}$ | do | 200K |
| $R_{26}$ | do | 400K |
| $R_{27}$ | do | 1500 |
| $R_{28}$ | do | 3K |
| $R_{29}$ | do | 3K |
| $R_{30}$ | do | 20K |

The field effect transistor $T_4$ provides a pinch-off and assures a stable voltage at the operational amplifier 47 so that the needle 23 of the meter 48 provides an accurate temperature output.

It will be understood that modifications and variations may be effected without departing from the spirit and scope of the novel concepts of the present invention.

I claim as my invention:

1. A temperature sensing device comprising: a first field effect semiconductor arranged to be positioned adjacent an object to sense the temperature thereof, an amplifier with input and output terminals and the input terminals connected to said first field effect semiconductor, a read-out device connected to the output terminals of said amplifier, a stabilized power source, the first field effect semiconductor and amplifier connected across said power supply so that the accuracy of the read-out device is maintained constant, said stabilized power source comprises: a battery, a second field effect semiconductor with its drain electrode connected to one terminal of said battery, a pair of Zener diodes connected in series between the other terminal of said battery and the gate electrode of said second field effect semiconductor, and a signal ground connected to the junction point between said pair of Zener diodes.

2. A temperature sensing device according to claim 1 wherein said first field effect semiconductor has its source and gate electrodes connected together and to the signal ground.

3. A temperature sensing device according to claim 2 wherein the drain electrode of the first field effect semiconductor is connected to a first input terminal of said amplifier, and the source and gate electrodes of the first field effect semiconductor are connected together and to the second input terminal of said amplifier.

4. A temperature sensing device according to claim 3 including a balance potentiometer connected in circuit with the stabilized power supply to allow calibration of the sensing device.

5. A temperature sensing device according to claim 4 including a delta temperature switch connected to said balance potentiometer to connect it to the input terminals of said amplifier when in the off position and to disconnect it from the amplifier when in the read position.

6. A temperature sensing device according to claim 5 comprising a first resistor, and a third zener diode and the first resistor connected in series and connected between the junction point of the pair of Zener diodes and the gate of the second field effect semiconductor.

7. A temperature sensing device comprising; a first field effect semiconductor arranged to be positioned adjacent an object to sense the temperature thereof, an amplifier with input and output terminals and the input terminals connected to said first field effect semiconductor, a read-out device connected to the output terminals of said amplifier, a stablized power source, the first field effect semiconductor and amplifier connected across said power supply so that the accuracy of the read-out device is maintained constant, a heating element mounted adjacent the first field effect semiconductor to preheat it to the approximate temperature of the object to be measured, an environment temperature sensing element connected in circuit with said heating element to control the amount of heating current and said read-out device coupled to said heating element to turn it on or off in response to the temperature sensed by the first field effect semiconductor.

8. A temperature sensing device according to claim 7 comprising a first transistor switch connected in series with the heating element across the terminals of the power source, a switch connected between the base and a second electrode of the first transistor, a second resistor connected between the base and said second electrode of said first transistor, and said read-out device coupled to said switch to close it when the temperature of the first field effect semiconductor goes above a desired preheat temperature.

9. A temperature sensing device according to claim 8 comprising, a second transistor connected to the environment temperature sensing element and said second transistor coupled to said first transistor.

10. A temperature sensing device according to claim 9 comprising, a third transistor coupled between said first and second transistors.

References Cited

UNITED STATES PATENTS

| | | | |
|---|---|---|---|
| 2,811,856 | 11/1957 | Harrison | 73—355 |
| 2,871,330 | 1/1959 | Collins | 73—362 XR |
| 3,106,645 | 8/1963 | Kaufman | 73—362 XR |
| 3,294,988 | 12/1966 | Packard. | |
| 3,303,413 | 2/1967 | Warner et al. | 307—304 XR |
| 3,310,713 | 3/1967 | Chambers et al. | 307—310 XR |
| 3,320,407 | 5/1967 | Holmes | 307—310 XR |

LOUIS R. PRINCE, Primary Examiner

F. SHOON, Assistant Examiner

U.S. Cl. X.R.

307—304

UNITED STATES PATENT OFFICE
CERTIFICATE OF CORRECTION

Patent No. 3,540,283          Dated November 17, 1970

Inventor(s)  J. M. DEAN

It is certified that error appears in the above-identified patent and that said Letters Patent are hereby corrected as shown below:

Column 6, line 10, delete "$R_{23}...50K$";

line 14, delete "$R_{26}...200K$".

Signed and sealed this 20th day of June 1972.

(SEAL)
Attest:

EDWARD M. FLETCHER, JR.      ROBERT GOTTSCHALK
Attesting Officer                Commissioner of Patents